(12) United States Patent
Takahashi

(10) Patent No.: US 6,907,251 B2
(45) Date of Patent: Jun. 14, 2005

(54) MOBILE RADIO TERMINAL AND ITS MOVING SPEED DETECTING METHOD

(75) Inventor: Hidehiro Takahashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 523 days.

(21) Appl. No.: 09/984,494

(22) Filed: Oct. 30, 2001

(65) Prior Publication Data

US 2002/0052210 A1 May 2, 2002

(30) Foreign Application Priority Data

Oct. 31, 2000 (JP) .................................. 2000-333969

(51) Int. Cl.$^7$ ................................................ H04Q 7/20
(52) U.S. Cl. ............................. 455/456.1; 455/67.11; 455/456.6
(58) Field of Search ................. 370/335, 342, 370/252; 455/441, 67.11; 324/160, 629, 173, 175, 166; 702/66, 72, 79, 189; 340/936; 701/214, 215; 342/442, 444

(56) References Cited

U.S. PATENT DOCUMENTS 5,396,645 A 3/1995 Huff
5,585,805 A 12/1996 Takenaka et al.
6,163,534 A * 12/2000 Wang ......................... 370/347

FOREIGN PATENT DOCUMENTS

WO WO 97/31497 8/1997

* cited by examiner

Primary Examiner—Marsha D. Banks-Harold
Assistant Examiner—Bryan Fox
(74) Attorney, Agent, or Firm—Oblon, Spivak, McClelland, Maier & Neustadt, P.C.

(57) ABSTRACT

A moving speed detecting method of a mobile radio terminal which makes communication with a base station outputting a pilot signal includes a step of predicting phases and amplitudes of the pilot signal from the base station by using a plurality of prediction methods having different characteristics. A calculating step calculates errors for the prediction results, which are obtained for respective prediction methods in the prediction step, and a prediction error comparing step compares the prediction errors with respect to each of the prediction methods, which are calculated by the calculating step, to detect a moving speed of the mobile radio terminal.

15 Claims, 5 Drawing Sheets

| # | 1 | 2 | 3 | 4 | 5 | 6 | 7 | 8 | 9 | 10 | 11 |
|---|---|---|---|---|---|---|---|---|---|---|---|
| Constant number | 0.317 | -0.049 | -0.195 | -0.175 | -0.069 | 0.048 | 0.122 | 0.128 | 0.077 | -0.001 | -0.069 |
| # | 12 | 13 | 14 | 15 | 16 | 17 | 18 | 19 | 20 | 21 | 22 |
| Constant number | -0.101 | -0.088 | -0.039 | 0.022 | 0.069 | 0.085 | 0.065 | 0.020 | -0.031 | -0.067 | -0.074 |
| # | 23 | 24 | 25 | 26 | 27 | 28 | 29 | 30 | 31 | 32 | 33 |
| Constant number | -0.050 | -0.007 | 0.038 | 0.065 | 0.066 | 0.040 | -0.002 | -0.043 | -0.065 | -0.061 | -0.031 |
| # | 34 | 35 | 36 | 37 | 38 | 39 | 40 | 41 | 42 | 43 | 44 |
| Constant number | 0.010 | 0.048 | 0.066 | 0.057 | 0.024 | -0.018 | -0.054 | -0.068 | -0.054 | -0.017 | 0.027 |
| # | 45 | 46 | 47 | 48 | 49 | 50 | 51 | 52 | 53 | 54 | 55 |
| Constant number | 0.062 | 0.072 | 0.052 | 0.010 | -0.039 | -0.073 | -0.078 | -0.050 | 0.001 | 0.055 | 0.090 |
| # | 56 | 57 | 58 | 59 | 60 | 61 | 62 | 63 | 64 | 65 | 66 |
| Constant number | 0.088 | 0.047 | -0.018 | -0.082 | -0.116 | -0.102 | -0.038 | 0.052 | 0.133 | 0.164 | 0.119 |
| # | 67 | 68 | 69 | 70 | 71 | 72 | 73 | | | | |
| Constant number | 0.000 | -0.153 | -0.271 | -0.267 | -0.063 | 0.382 | 1.058 | | | | |

FIG. 7

MOBILE RADIO TERMINAL AND ITS MOVING SPEED DETECTING METHOD

CROSS-REFERENCE TO RELATED APPLICATIONS

This application is based upon and claims the benefit of priority from the prior Japanese Patent Application No. 2000-333969, filed Oct. 31, 2000, the entire contents of which are incorporated herein by reference.

BACKGROUND OF THE INVENTION

1. Field of the Invention

The present invention relates to a mobile radio terminal and its moving speed detecting method.

2. Description of the Related Art

In a mobile communication system to transmit a pilot signal from a base station, as a method to detect a moving speed of a mobile radio terminal, the methods such as (1) a method to estimate a speed by detecting a pitch of fading, (2) a method to estimate a speed from a time difference between a transmission frame and a reception frame, (3) a method to estimate a speed from a movement on a time axis by detecting a Path in a CDMA system and (4) a method to estimate a speed from the displacement of a career frequency by detecting a Path in a CDMA system have been already known.

The above described methods for detecting a moving speed of a mobile radio terminal had the following problems, respectively.

(1) A conventional art to estimate a speed by detecting a pitch of fading requires a lot of complicated calculations to detect a pitch and it takes much time to average the obtained pitch.

(2) According to a conventional art to estimate a speed from a time difference between a transmission frame and a reception frame, a distance between a mobile radio terminal and a base terminal is detected once to estimate a speed as its time differential. However, the distance is detected in units of 1 Chip (about 80 m in W-CDMA), so that it is not possible to detect the speed for a movement of a terminal that is shorter than the length of 1 Chip.

(3) A conventional art to estimate a speed from a movement on a time axis by detecting a Path in a CDMA system requires movement of an at least 1 Chip in order to estimate the speed as same as (2), so that it is not possible to detect the speed for a movement of a terminal that is shorter than the length of 1 Chip.

(4) According to a conventional art to estimate a speed from the displacement of a career frequency by detecting a Path in a CDMA system, generally, the number of Paths is small, namely, 2 to 6 (in W-CDMA), so that the accuracy of the estimation of the speed is low.

The present invention has been made taking the problems into consideration, an object of which is to provide a mobile radio terminal capable of detecting a moving speed of the mobile radio terminal with a time and a moving distance which are shorter compared to a conventional method and its moving speed detecting method.

BRIEF SUMMARY OF THE INVENTION

To achieve the above objects, in a first aspect, the present invention provides a moving speed detecting method of a mobile radio terminal which makes communication with a base station broadcasting a pilot signal, comprising the steps of:

receiving the pilot signal at a first time;

predicting a first prediction characteristic value of a signal to be received at a second time based on the received pilot signal by using a first prediction method;

predicting a second prediction characteristic value of a signal to be received at the second time based on the received pilot signal by using a second prediction method;

receiving a pilot signal at the second time after receiving the pilot signal at the first time;

generating an actual value of the pilot signal received at the second time;

calculating a first difference by comparing the predicted first prediction characteristic value with the generated actual value;

calculating a second difference by comparing the predicted second prediction characteristic value with the generated actual value;

detecting moving speed of the mobile radio terminal apparatus based on the calculated first and second differences.

In a second aspect, the present invention provides a moving speed detecting method of a mobile radio terminal which makes communication with a base station broadcasting a pilot signal, comprising the steps of:

predicting phases and amplitudes of the pilot signal from the base station by using a plurality of prediction methods having different characteristics;

calculating errors for the prediction results, which are obtained for respective prediction methods in said prediction step; and comparing the prediction errors with respect to each of the prediction methods, which are calculated by said calculating step, to detect a moving speed of said mobile radio terminal.

In a third aspect, the present invention provides a mobile radio terminal which makes communication with a base station broadcasting a pilot signal, comprising:

first receiving means for receiving the pilot signal at a first time;

predicting means for predicting a first prediction characteristic value of a signal to be received at a second time based on the received pilot signal by using a first prediction method, and for predicting a second prediction characteristic value of a signal to be received at the second time based on the received pilot signal by using a second prediction method;

second receiving means for receiving a pilot signal at the second time after receiving the pilot signal at the first time;

generating means for generating an actual value of the pilot signal received at the second time;

calculating means for calculating a first difference by comparing the predicted first prediction characteristic value with the generated actual value and for calculating a second difference by comparing the predicted second prediction characteristic value with the generated actual value;

detecting means for detecting moving speed of the mobile radio terminal apparatus based on the calculated first and second differences.

In a fourth aspect, the present invention provides mobile radio terminal which makes communication with a base station broadcasting a pilot signal, comprising:

a predicting unit to predict phases and amplitudes of the pilot signal from the base station by using a plurality of prediction methods having different characteristics;

a calculating unit to calculate errors for the prediction results which are obtained for respective prediction methods by said predicting unit; and a prediction error comparing unit to compare the prediction errors with respect to each of the prediction methods, which are calculated by said calculating unit, to detect a moving speed of said mobile radio terminal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a diagram for illustrating a table including 73 pieces of coefficients to be used in the present embodiment.

DETAILED DESCRIPTION OF THE INVENTION

The embodiment of the present invention will be described in detail with reference to the drawings below.
(First Embodiment)

Figure 1:
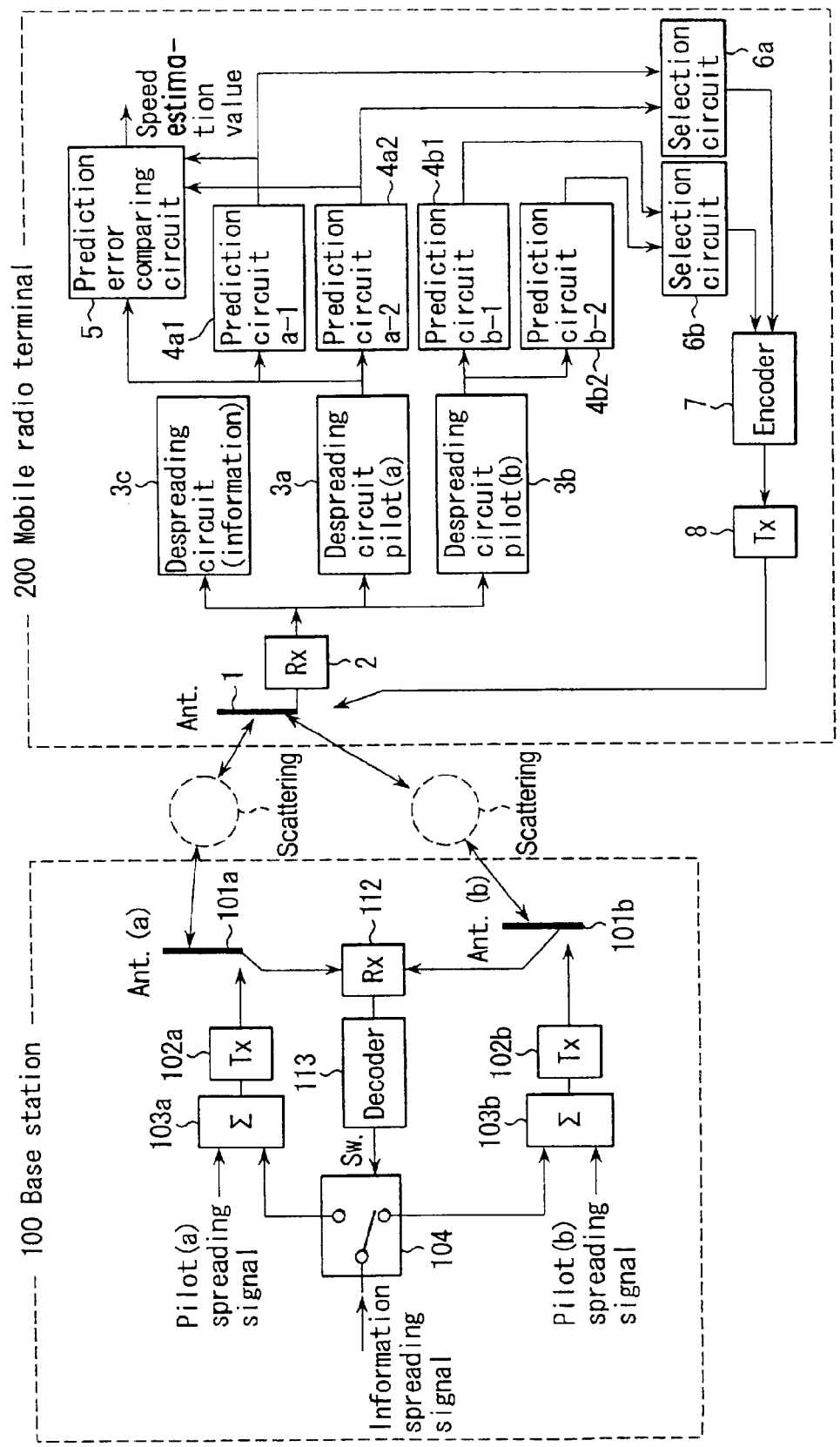
FIG. 1 is a diagram for illustrating a constitution of a first embodiment according to the present invention.

FIG. 1 shows a constitution of the first embodiment according to the present invention. A left side of FIG. 1 comprises a base station 100 and a right side thereof comprises a mobile radio terminal 200. The base station 100 includes a pair of transmission/reception antennas 101a and 101b, a radio reception circuit 112, radio reception circuits 102a and 102b, counting circuits 103a and 103b, a switch 104 and a decoder 113.

Alternatively, the mobile radio terminal 200 includes an antenna 1, a radio reception circuit 2, despreading circuits 3a, 3b and 3c, prediction circuits 4a1, 4a2, 4b1 and 4b2, a prediction error comparing circuit 5, selection circuits 6a and 6b, an encoder 7 and a radio transmission circuit 8. According to the first embodiment, the output of the prediction circuits 4a1 and 4a2 is only connected to the prediction error comparing circuit 5.

The operation of the first embodiment will be explained below. In this explanation, an IMT-2000 mobile communication system defined by 3GPP is taken as an example for a parameter with regard to transmission. According to a typical parameter, a radio frequency is 2 GHz band, a time interval to control a transmission antenna is about 667 $\mu$seconds equivalent to 1.5 KHz and the number of antennas of the base station and the number of pilot signals which are peculiar to the antenna is 2. The pilot signals are orthogonal each other in code.

In FIG. 1, a unique pilot signal is steadily broadcast from two transmission/reception antennas 101a and 101b of the base station 100. The information broadcast from the base station 100 to the mobile radio terminal 200 is spreaded by means which is not illustrated in the drawings so as to be transmitted from any one of two transmission/reception antennas 101a and 101b. It is decided depending on the information from the mobile radio terminal 200 from which antenna the information is transmitted.

Alternatively, the IMT-2000 system controls the weight of a signal (a quantity of the information) to be transmitted from each of the two transmission/reception antennas 101a and 101b including a phase. However, in this case, in order to simplify the explanation, it is assumed that the IMT-2000 system comprises such a system as to determine a transmission antenna alternatively (the weight of the antenna is 0 or 1 complementarily).

Each of the two transmission/reception antennas 101a and 101b transmits a signal including an at least specific pilot signal. The signals from the two transmission/reception antennas 101a and 101b reach to the antenna 1 of the mobile radio terminal 200 via separate transmission paths. Each of transmission paths includes scattering by the object around the mobile radio terminal 200, so that so called rayleigh fading is generated in accordance with the movement of the mobile radio terminal 200. The mobile radio terminal 200 is capable of separately detecting amplitude and a phase of two pilot signals by two despreading circuits 3a and 3b.

Figure 4:
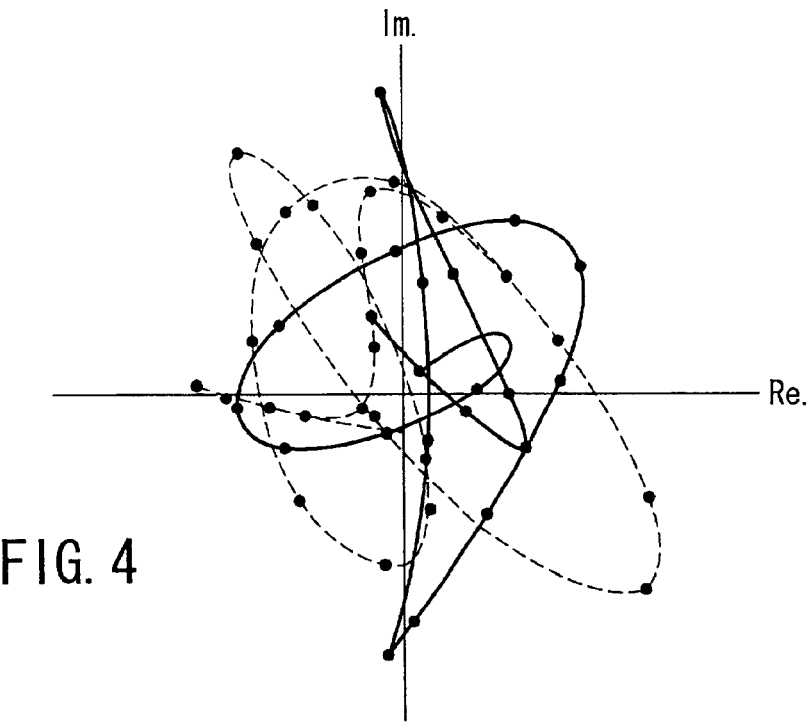
FIG. 4 is a diagram for illustrating tracks of separate pilot signals on a complex plane by a solid line and a broken line.
Figure 5:
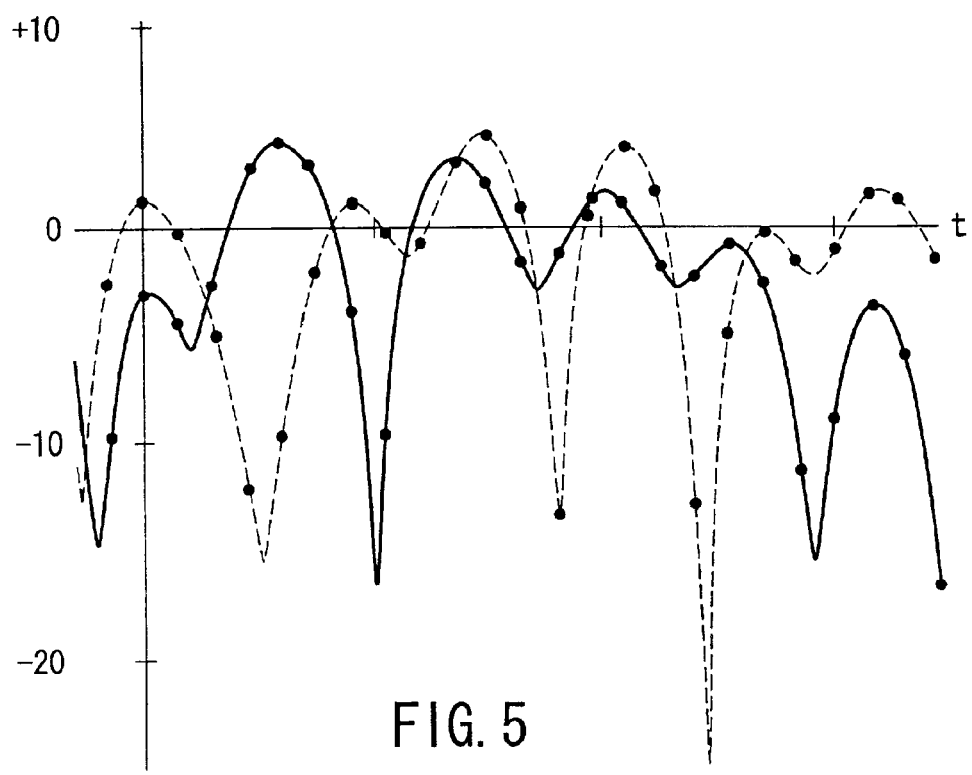
FIG. 5 is a diagram for illustrating an amplitude variation of the same fading by dB display.

FIG. 4 shows tracks of separate pilot signals on a complex plane by a solid line and a broken line. FIG. 5 shows an amplitude variation of the same fading by dB indication. The mobile radio terminal 200 observes the transmission loss from the two base station antennas 101a and 101b as described above. Then, as a result, it is detected from which antenna the information component should be transmitted to receive the information component at a higher level.

This detection result is encoded by an encoder 7 as a transmission antenna selection command and then, the encoded result is transmitted via a transmitter 8 and the antenna 1. The base station 100 receives the transmitted result by a receiver 112 via the antennas 101a and 101b and a decoder 113 extracts a transmission antenna selection command from the received result so as to control a transmission antenna changing switch 104. A principle of a feed back type transmission diversity is as described above.

According to the above explanation of the principle, the mobile radio terminal 200 observes the transmission loss of the two transmission paths and the transmission antenna selection command is transmitted in units of a slot (1,500 Hz, 667 $\mu$ seconds). Alternatively, the base station 100 receives the transmission antenna selection command and switches one of antenna to another antenna to transmit the information component in accordance with this command also in units of a slot.

Further, there is a time delay for signal processing during switching the antenna, so that, in the case that the mobile radio terminal 200 observes the transmission loss in the (N)th slot, this result is reflected in a head of the (N+2)th slot. In other words, the mobile radio terminal 200 predicts the transmission loss in the (N+2)th slot on the basis of the observation in the (N)th slot, so that the mobile radio terminal 200 generates the transmission antenna selection command.

As a method to predict the transmission loss, a method has been conventionally known such that an observation value in the (N)th slot is defined as a prediction characteristic value of the transmission loss in the (N+2)th slot (a prediction method 1). This method is effective when the moving speed of the mobile radio terminal 200 is low. However, as the moving speed becomes higher, the prediction accuracy is deteriorated, so that the prediction errors are increased. If the prediction error according to the prediction method 1 is obtained by a simulation in the case that a radio frequency and a slot period or the like are defined as a parameter of IMT-2000 of 3GPP, a property shown in FIG. 6 by a narrow line is obtained. As obvious from the drawing, the prediction error is not so large, i.e., −12 dB at 2 m per second. However, the prediction error is deteriorated at 18 m per second, i.e., −6 dB.

Figure 3:
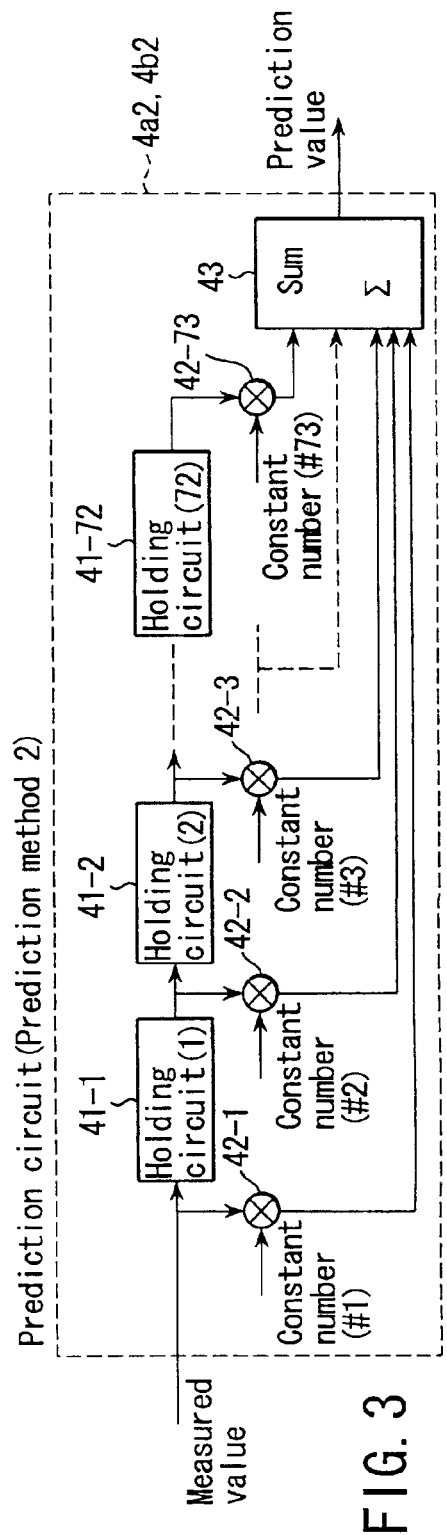
FIG. 3 is a diagram for illustrating a constitution of a prediction method 2.

On the other hand, as a prediction method 2, a method is suggested such that it predicts the transmission loss by the prediction circuit configured by a FIR filter of a high order more than 30 stages as shown in FIG. 3. In FIG. 3, reference numerals 41-1, 41-2, 41-3, . . . , and 41-72 denote holding circuits (1) to (72) for holding the inputted measured values. Further, reference numerals 42-1, 42-2, 42-3, . . . and 42-73 denote multiplication circuits to multiply the measured value by a constant number. A counting circuit 43 adds the output from the above described multiplication circuits 42-1, 42-4, 42-3, . . . and 42-73 and outputs the sum as the prediction value.

Figure 6:
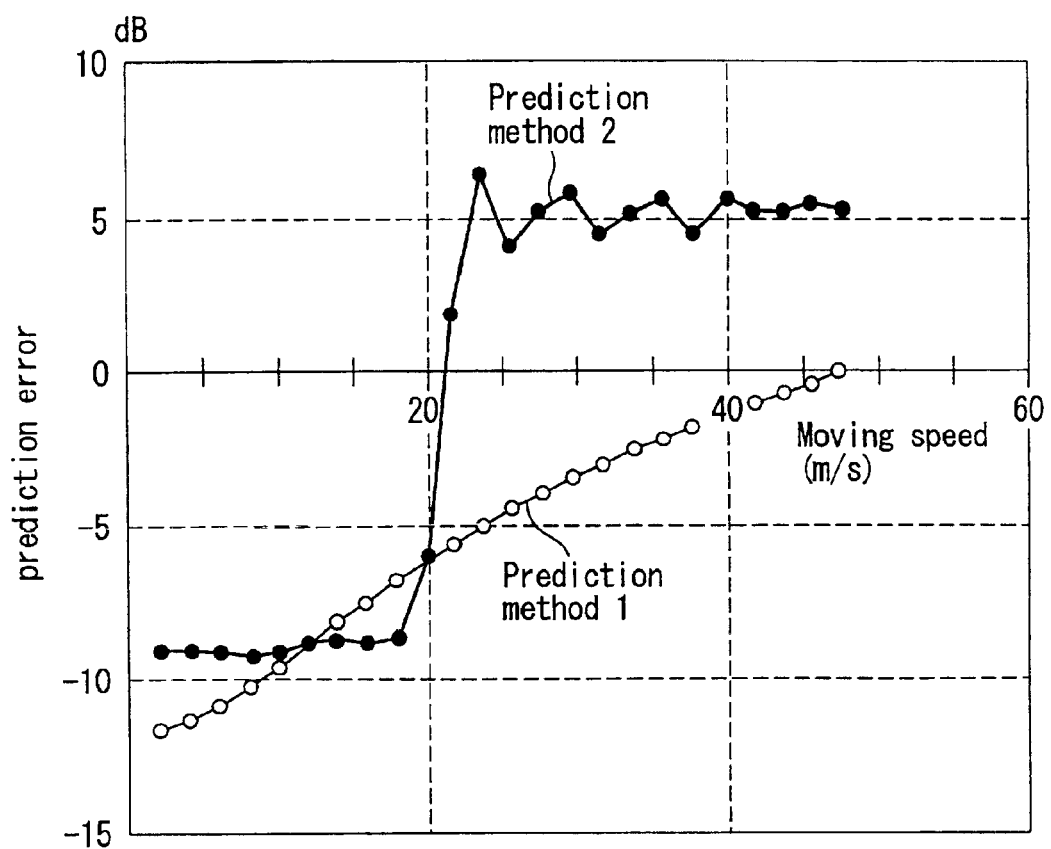
FIG. 6 is a diagram such that a prediction error according to a prediction method 1 is obtained by a simulation when a radio frequency and a slot frequency or the like are defined as a parameter of 1MT-2000 of 3GPP.

FIG. 3 shows an example of a FIR filter having 73 stages. If the prediction error is obtained by a simulation in the case of using 73 pieces of the coefficients shown in FIG. 7 corresponding to this, a property shown by a bold line shown in FIG. 6 is obtained. As obvious from the drawing, the prediction error in the range of 2 m per second to 18 m per second is constantly about −9 dB.

If the prediction error is compared to the observation value after time passes from the prediction, it is possible to know how that prediction is precise. Alternatively, comparing respective prediction errors of the above described two prediction methods in which relations between the moving speed and the prediction errors are different, it is possible to predict the moving speed of the mobile radio terminal 200.

Figure 2:
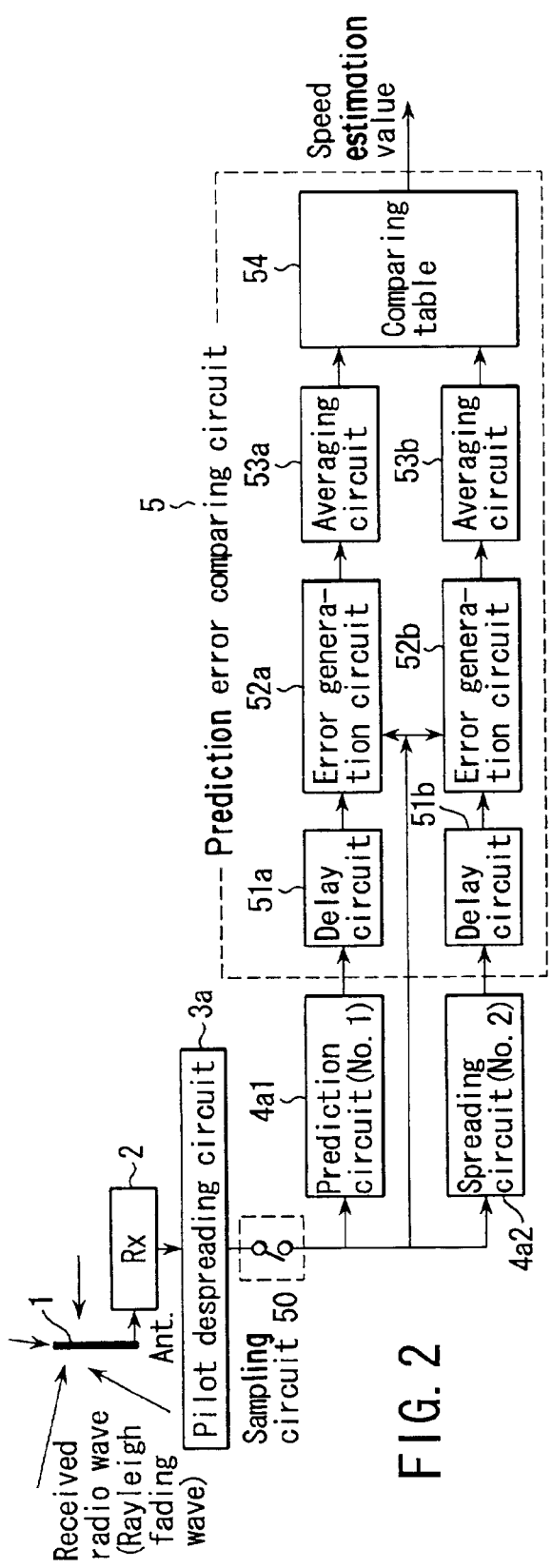
FIG. 2 is diagram for illustrating a specific constitution to estimate a moving speed of a mobile radio terminal 200.

FIG. 2 shows a specific constitution to estimate the moving speed of the mobile radio terminal 200. In FIG. 2, the prediction error comparing circuit 5 is configured by delay circuits 51a and 51b, error generation circuits 52a and 52b, averaging circuits 53a and 53b and a comparing table 54. In FIG. 2, a reference numeral 1 denotes an antenna, a reference numeral 2 denotes a radio reception circuit, a reference numeral 3a denotes a despreading circuit and a reference numeral 50 denotes a sampling circuit.

In the prediction error comparing circuit 5, the prediction characteristic value in the (N+2)th slot which is obtained by each the two prediction methods at the (N)th slot is delayed for two slots by the delay circuits 51a and 51b. Then, the delayed prediction value is compared to the observation value which is obtained at the (N+2)th slot in the error generation circuits 52a and 52b, so that the prediction error is generated.

The prediction errors predicted by respective prediction methods are compared to each other by the comparing table 54 after removing the influences such as a noise or the like therefrom by the averaging circuits 53a and 53b. For example, according to the above described example, the comparing table 54 stores the data such that it outputs the estimation speed 2 m per second if the error predicted by the prediction method 1 is −12 dB and the error predicted by the prediction method 2 is −9 dB and it outputs the estimation speed 18 m per second if the error predicted by the prediction method 1 is −6 dB and the error predicted by the prediction method 2 is −9 dB.

The methods to estimate the moving speed of the mobile radio terminal 200 are as described above.

(Modified Embodiment of the First Embodiment)

According to the above described first embodiment, the predicted errors are compared with respect to only one pilot signal. However, comparing the predicted errors with respect to other pilot signal, it is possible to improve the accuracy in the estimation of the speed with putting together the results.

Alternatively, a parameter such as the number of the FIR stages in the prediction method 2 shown in the above described first embodiment and the coefficients shown in FIG. 7 are taken as only an example. If the number of the FIR stages is defined not less than about 30 stages, it is possible to obtain an effect by carrying out the present invention.

Alternatively, according to the above described first embodiment, the IMT-2000 system of 3GPP is taken as an example. However, it is possible to carry out the present invention despite that the transmission diversity is performed or not and without limiting the communication system to code division multiple access (CDMA). It is not possible to apply the present invention to a system, which employs an analog modulation system such as AMPS or the like. However, most of the mobile radio communication systems, which employ a digital communication system, include a signal referred to as a pilot signal and a unique word, so that, if the present invention is performed with respect to this signal, as shown in the above described embodiment, the fading is predicted by the different prediction methods and it is possible that the mobile speed is estimated from these prediction accuracy.

Alternatively, it is desirable that a content of the comparing table 54, which is employed in the above described embodiment, is changed by an electric power ratio of a desired signal and a noise (C/N). Therefore, it is possible to improve the accuracy of the estimation of the speed by modifying the comparing table and using a table to also input the C/N ratio.

According to the present invention, it is possible to estimate the moving speed of the mobile radio terminal by a short measurement distance, during a short measurement time and further, with a higher degree of accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A moving speed detecting method of a mobile radio terminal which makes communication with a base station broadcasting a pilot signal, comprising the steps of:

receiving the pilot signal at a first time;

predicting a first prediction characteristic value of a signal to be received at a second time based on the received pilot signal by using a first prediction method;

predicting a second prediction characteristic value of a signal to be received at the second time based on the received pilot signal by using a second prediction method;

receiving a pilot signal at the second time after receiving the pilot signal at the first time;

generating an actual value of the pilot signal received at the second time;

calculating a first difference by comparing the predicted first prediction characteristic value with the generated actual value;

calculating a second difference by comparing the predicted second prediction characteristic value with the generated actual value;

detecting moving speed of the mobile radio terminal apparatus based on the calculated first and second differences.

2. A moving speed detecting method of a mobile radio terminal according to claim 1, wherein each of the steps of predicting the first and second prediction characteristic values includes a step of predicting a phase and an amplitude of the pilot signal, and the information with regard to the phase and the amplitude of the pilot signal is commonly used as feed back information of a feedback type transmission diversity.

3. A moving speed detecting method of a mobile radio terminal according to claim 1, wherein one of said plurality of prediction methods comprises a method such that a sampled pilot signal is defined as a prediction value of a next pilot signal as it is.

4. A moving speed detecting method of a mobile radio terminal according to claim 1, wherein a CN ratio of an observed pilot signal is used as a parameter in the steps of calculating the first and second differences.

5. A moving speed detecting method of a mobile radio terminal which makes communication with a base station broadcasting a pilot signal, comprising the steps of:

predicting phases and amplitudes of the pilot signal from the base station by using a plurality of prediction methods having different characteristics;

calculating errors for the prediction results, which are obtained for respective prediction methods in said prediction step; and comparing the prediction errors with respect to each of the prediction methods, which are calculated by said calculating step, to detect a moving speed of said mobile radio terminal.

6. A moving speed detecting method of a mobile radio terminal according to claim 5, wherein the information with regard to the phase and the amplitude of the pilot signal, which are predicted by said prediction step, is commonly used as feed back information of a feedback type transmission diversity.

7. A moving speed detecting method of a mobile radio terminal according to claim 5, wherein one of said plurality of prediction methods comprises a method such that a sampled pilot signal is defined as a prediction value of a next pilot signal as it is.

8. A mobile radio terminal which makes communication with a base station broadcasting a pilot signal, comprising:

first receiving means for receiving the pilot signal at a first time;

predicting means for predicting a first prediction characteristic value of a signal to be received at a second time based on the received pilot signal by using a first prediction method, and for predicting a second prediction characteristic value of a signal to be received at the second time based on the received pilot signal by using a second prediction method;

second receiving means for receiving a pilot signal at the second time after receiving the pilot signal at the first time;

generating means for generating an actual value of the pilot signal received at the second time;

calculating means for calculating a first difference by comparing the predicted first prediction characteristic value with the generated actual value and for calculating a second difference by comparing the predicted second prediction characteristic value with the generated actual value;

detecting means for detecting moving speed of the mobile radio terminal apparatus based on the calculated first and second differences.

9. A mobile radio terminal according to claim 8, wherein the predicting means includes means for predicting a phase and an amplitude of the pilot signal, wherein the information with regard to the phase and the amplitude of the pilot signal, which are predicted by said predicting unit, is commonly used as a feed back information of a feedback type transmission diversity.

10. A mobile radio terminal according to claim 8, wherein one of said plurality of prediction methods comprises a method such that a sampled pilot signal is defined as a prediction value of a next pilot signal as it is.

11. A mobile radio terminal according to claim 8, wherein a CN ratio of the observed pilot signal is used as a parameter in calculating the first and second differences by said calculating means.

12. A mobile radio terminal which makes communication with a base station broadcasting a pilot signal, comprising:

a predicting unit to predict phases and amplitudes of the pilot signal from the base station by using a plurality of prediction methods having different characteristics;

a calculating unit to calculate errors for the prediction results which are obtained for respective prediction methods by said predicting unit; and a prediction error comparing unit to compare the prediction errors with respect to each of the prediction methods, which are calculated by said calculating unit, to detect a moving speed of said mobile radio terminal.

13. A mobile radio terminal according to claim 12, wherein a information with regard to the phase and the amplitude of the pilot signal, which are predicted by said predicting unit, is commonly used as the feed back information of a feedback type transmission diversity.

14. A mobile radio terminal according to claim 12, wherein one of said plurality of prediction methods comprises a method such that a sampled pilot signal is defined as a prediction value of a next pilot signal as it is.

15. A mobile radio terminal according to claim 12, wherein a CN ratio of the observed pilot signal is used as a parameter upon comparing the prediction error in a plurality of prediction methods having different characteristics in said prediction error comparing unit.

* * * * *